United States Patent [19]

Lundberg et al.

[11] Patent Number: 4,497,923

[45] Date of Patent: Feb. 5, 1985

[54] SHEAR THICKENING OF ORGANIC DILUENTS VIA INTERPOLYMER COMPLEXES

[75] Inventors: Robert D. Lundberg, Bridgewater; Dennis G. Peiffer, East Brunswick; Ilan Duvdevani, Leonia; Robert R. Phillips, Spring Lake Heights, all of N.J.

[73] Assignee: Exxon Research & Engineering Co., Florham Park, N.J.

[21] Appl. No.: 547,904

[22] Filed: Nov. 2, 1983

[51] Int. Cl.³ .............................. C08J 3/08; C08J 3/10; C08K 5/01; C08K 5/04
[52] U.S. Cl. .................................... 524/107; 524/147; 524/186; 524/210; 524/284; 524/300; 524/356; 524/366; 524/367; 524/379; 524/505; 524/516; 524/521; 524/924; 525/203; 525/217
[58] Field of Search ............... 525/203, 217; 524/210, 524/924, 107, 505, 516, 366, 367, 356, 521, 523, 284, 233, 300, 379, 147, 186

[56] References Cited

U.S. PATENT DOCUMENTS 3,586,744  1/1971  Michaels et al. .................... 525/203
3,974,241  4/1976  Lundberg et al. .................. 525/186

Primary Examiner—Allan M. Lieberman
Attorney, Agent, or Firm—Richard E. Nanfeldt

[57] ABSTRACT

The present invention relates to a process for the viscosification of an organic liquid which comprises the steps of forming a first solution of an anionic polymer dissolved in the organic liquid; forming a second solution of a cationic polymer dissolved in the organic liquid; and mixing the first and the second solutions together to form an interpolymer complex of the anionic and cationic polymer in the organic liquid, wherein the organic liquid containing the interpolymer complex has improved viscosification properties. This solution possesses higher viscosity than the mean of the separate viscosities of the starting solutions at relatively low solids content. Moreover, these interpolymer complexes, in hydrocarbon solutions, can be formulated to exhibit shear thickening at increased shear rates. This property is useful in such technological applications as antimisting of the solvent.

15 Claims, No Drawings

SHEAR THICKENING OF ORGANIC DILUENTS VIA INTERPOLYMER COMPLEXES

FIELD OF THE INVENTION

The present invention relates to a process for the viscosification of an organic liquid which comprises the steps of forming a first solution of an anionic polymer dissolved in the organic liquid; forming a second solution of a cationic polymer dissolved in the organic liquid; and mixing the first and the second solutions together to form an interpolymer complex of the anionic and cationic polymer in the organic liquid, wherein the organic liquid containing the interpolymer complex has improved viscosification properties. This solution possesses higher viscosity than the mean of the separate viscosities of the starting solutions at relatively low solids content. Moreover, these interpolymer complexes, in hydrocarbon solutions, can be formulated to exhibit shear thickening at increased shear rates. This property is useful in such technological applications as antimisting of the solvent.

DESCRIPTION OF PRIOR ART

In recent years, interpolymer complexes have received considerable attention in the literature due to their interesting and unique properties and their similarity to certain biological systems. In most instances, these complexes are formed by intimately mixing aqueous solutions containing high-charge density polyelectrolytes possessing opposite charge. When these polymer molecules meet in solution, the interaction between oppositely charged sites will cause the release of their associated counterions forming the complex. The counterions are now free to diffuse into the bulk solution. Normally, phase separation occurs upon prolonged standing. These high-charge density complexes are not readily formed in organic solvents due to the insolubility of the individual components. Therefore, little work has detailed the solution properties of these systems. To the inventors' knowledge, few studies have focused on the viscosification aspects of high or low-charge density complexes in organic diluents. In these studies, viscosity is used only as a tool to study the development and mechanism of complex formation.

There are many applications for thickened or gelled solutions of polymers in organic liquids which are quite diverse. There are also a number of physical and chemical techniques for preparing such systems. The present invention is concerned with a process for creating a liquid which increases in viscosity with increasing shear rate. The potential applications for this process and the products derived therefrom will be evident in the instant application. Some of these applications are as a viscosifier and shear thickening additive for organic liquids or solutions, for gelling an organic liquid and for antimisting applications.

Shear thickening fluids are rare and have mostly been demonstrated in suspensions (W. H. Bauer and E. A. Collins in "Rheology", Vol. 4, edited by F. R. Eirich, page 459, Academic Press, 1967). Polymer solutions and melts are known, on the other hand, to exhibit strong shear thinning behavior while most liquids of lower molecular weight are Newtonian.

A polymer which was introduced by ICI (FM-9) as an antimisting agent for jet fuel was shown to be "progressively shear thickening." Work done by S. T. J. Peng and R. F. Landel, J. Appl. Phys., 52, 5988 (1981), at Jet Propulsion Laboratories under an FAA contract for antimisting in jet fuels showed that subjecting a solution of FM-9 in jet fuel at about 0.3 to 1.0 weight percent polymer to steady shearing will produce viscous growth with time. It was found that the time scale and the extent of thickening can be accelerated by either increasing the concentration or by increasing the shear rate. The composition of FM-9 is not disclosed by ICI or by other agents working with this polymer. Peng and Landel correlate antimisting behavior with shear thickening or with high elongational viscosity in "Rheology", Vol. 2, edited by G. Astarita, page 385, Plenum Press, 1980.

This invention teaches the enhancement of the viscosity of hydrocarbon solutions with shear rate by preparing polymers which are capable of building large networks. A way for achieving such networks is the complexation of two dissolved polymers, one having low levels of anionic charges along its backbone and the other having low levels of cationic charges along its backbone. The complex can be achieved by dissolving each polymer alone in the solvent and combining the two solutions. Alternately, each polymer can be codissolved in the same solution system. When polymer molecules of opposite charges meet in solution, an interaction occurs between oppositely charged sites, forming a complex which involves the associated counterions that may have been present in one or both polymers.

In order to avoid phase separation of the complex in solution, the charge density along the polymer backbones should be relatively low. The resulting solution of such a complex is then significantly more viscous than solutions containing the individual polymers, providing that the total numbers of negative and positive charges are correctly balanced. Upon addition of a strongly polar agent such as an alcohol, the complex can be disturbed and the viscosity reduced.

This invention further teaches that, for a given balance of the various parameters that may be varied in an interpolymer complex solution, an unexpected shear thickening behavior (Dilatant or Rheopectic Behavior) may be obtained. These parameters include:

Backbone nature of each of the polymers (or copolymers).

The charge densities along the polymer backbones.

The molecular weight of each polymer.

The ratio between the polymers introduced into solution.

The solvent (and cosolvent, if any).

The concentration of polymer in solution.

We report the finding that low-charge density interpolymer complexes (styrene-co-4-vinyl pyridine:sulfonated ethylene-propylene ionomer) are useful in viscosifying relatively nonpolar solutions (as required in a variety of well control and work-over fluids, various pharmaceutical applications, oil additives and a host of other systems containing a hydrocarbon-based solvent). These complexes are soluble in a nonpolar solution, but more importantly, possess a substantially higher viscosity than the corresponding individual low-charge density copolymer components. As detailed earlier, these results are unexpected since the general tendency of interpolymer complexes is to be rather insoluble in this environment. As a result these latter materials, prior to the findings of this specification, have poor viscosification properties and thickening efficiency.

Most solutions of high molecular weight polymers are expected to exhibit a shear thinning behavior. This is due to the destruction of an entangled network or a reduced interference between the polymer molecules after orientation at high shear rates. We report the finding that these soluble interpolymer complexes, under narrow conditions, seem on the other hand to possess an ability to establish even larger networks or act as if networks are larger under high shear rates. The exact nature of the interactions under shear as compared to those under rest are not yet understood and cannot, therefore, be predicted. In some cases, interpolymer complexes may show a conventional shear thinning behavior, in other cases they may be shear thickening with a relatively quick response to shear rate change (dilatant behavior), or they may be "progressively shear thickening" with time under shear (rheopectic or antithixotropic behavior).

ANTIMISTING

Shear thickening behavior can be useful in affecting antimisting characteristics. Such a solution can behave as a fairly low viscosity fluid at low shear rates. However, the viscosity begins to rise as the shear rate is progressively increased. Accordingly, the solution can more effectively resist breakup into a mist of minute droplets. This, of course, is a very desirable attribute in a variety of fluids of technological interest. Furthermore, for this instant invention, another desirable attribute is to be able to reverse (or erase) the above mentioned antimisting behavior and render it atomizable. With regard to interpolymer complexes, this is readily achieved through addition of a soluble component capable of weakening or totally disrupting the ionic linkages which hold the complex together. Such a component should be highly polar, soluble in the solution containing the dissolved interpolymer complex and capable of efficiently migrating (and disrupting) to the ionic linkages. Alcohols and amines are only two of many possible examples. Interestingly, in other well-know antimisting agents, such as ICI's FM-9, degradation of the polymer and its associated antimisting characteristics occurs by flowing the solution through high shear rate devices.

SUMMARY OF THE INVENTION

The present invention relates to a process for the viscosification of an organic hydrocarbon liquid having a viscosity typically, but not necessarily less than about 10 cps. at 100° F. which includes the steps of forming a first solution of an anionic polymer in the organic hydrocarbon liquid; forming a second solution of a cationic polymer in the organic hydrocarbon liquid and mixing the first and second solutions to form a solution of the organic hydrocarbon liquid and an interpolymer complex of the cationic and an anionic polymer, wherein the resultant solution of the organic hydrocarbon liquid has a viscosity of at least about 10 cps at 100° F. and further more exhibits a further increase in viscosity as shear rate increases.

Accordingly, it is a primary object of the instant invention to describe an economical process for forming a highly viscous organic hydrocarbon solution containing a soluble interpolymer complex having a viscosity greater than the mean of the two individual polymer components, typically at least 10 cps.

A further object of the instant invention is to provide a process for forming a homogeneous solution which can be used as a viscosifier for hydrocarbon systems, said fluid displaying shear thickening behavior.

A still further object of the instant invention is to employ the instant invention as an integral part of antimisting applications.

A still further object of the instant invention is to provide a process for forming a homogeneous solution which can be used as a progressive thickener for hydrocarbon systems under high shear conditions.

GENERAL DESCRIPTION

The present invention relates to a process for the viscosification of an organic hydrocarbon liquid having a viscosity typically, but not necessarily less than about 10 cps. which includes the steps of forming a first solution of an anionic polymer in the organic hydrocarbon liquid; forming a second solution of a cationic polymer in the organic hydrocarbon liquid and mixing the first and second solutions to form a solution of the organic hydrocarbon liquid and an interpolymer complex of the cationic and an anionic polymer, wherein the resultant solution of the organic hydrocarbon liquid has a viscosity of at least about 10 cps, and further more exhibits shear thickening behavior.

The component materials of the instant process generally include a water insoluble interpolymer complex in an organic hydrocarbon solvent system to form a solution with a concentration level of 0.01 to 10 weight percent.

A second aspect of the instant invention relates to the fact that the interpolymer complexes are more effective thickeners than the two individual component polymers.

A third aspect of the instant invention relates to the use of these interpolymer complexes in nonpolar hydrocarbon solvents as a shear thickening agent under increased shear conditions.

A fourth aspect of the instant invention relates to the observation that the thickening aspects of these interpolymer complexes can be markedly reduced or completely eliminated with the use of a suitable low molecular weight polar cosolvent.

In general, the interpolymer complex is formed from the interaction in solution of a water insoluble anionic, ionomeric polymer and a cationic copolymer such as styrene/vinyl pyridine copolymer. The water insoluble anionic ionomeric polymer will comprise from about 4 to about 200 milliequivalents of pendant ionomeric groups per 100 grams of polymer, more preferably from 10 to 100 meq. pendant ionomeric groups. The ionic groups may be conveniently selected from the groups consisting of carboxylate, phosphonate, and sulfonate, preferably sulfonate groups. In most instances, the ionomers utilized in the instant invention are neutralized with the basic materials selected from Groups IA, IIA, IB and IIB of the Periodic Table of Elements and lead, tin and antimony, as well as ammonium and amine counterions. Ionic polymers which are subject to the process of the instant invention are illimitable and include both plastic and elastic polymers. Specific polymers include sulfonated polystyrene, sulfonated t-butyl styrene, sulfonated ethylene copolymers, sulfonated atactic propylene polymers and propylene copolymers, sulfonated styrene/acrylonitrile copolymers, sulfonated styrene/methyl methacrylate copolymers, sulfonated block copolymers of styrene/ethylene oxide, acrylic acid copolymers with styrene, sulfonated polyisobutylene, sulfonated ethylene-propylene terpolymers, sulfonated polyisoprene, and sulfonated elastomers and their copolymers. The preferred polymers of the instant invention are ethylene-propylene terpolymers and polystyrene, wherein ethylene-polystyrene terpolymers are most preferred.

Neutralization of the cited polymers with appropriate metal hydroxides, metal acetates, metal oxides, or ammonium hydroxide etc., can be conducted by means well-known in the art. For example, the sulfonation process as with Butyl rubber, containing a small 0.3 to 1.0 mole percent unsaturation, can be conducted in a suitable solvent such as toluene, with acetyl sulfate as the sulfonated agent, such as described in U.S. Pat. No. 3,836,511. The resulting sulfonic acid derivative can then be neutralized with a number of different neutralization agents such as a sodium phenolate and similar metal salts. The amounts of such neutralization agents employed will normally be stoichiometrically to the amount of free acid in the polymer plus an unreacted reagent which is still present. It is preferred that the amount of neutralizing agent be equal to the molar amount of sulfonating agent originally employed plus 10 percent more to ensure full neutralization. The use of more of such neutralization agent is not critical. Sufficient neutralization agent is necessary to effect at least 50 percent neutralization of the sulfonic acid groups present in the polymer, preferably at least 90 percent, and most preferably essentially complete neutralization of such acid groups should be effected.

The degree of neutralization of said ionomeric groups may vary from 0 (free acid form) to greater than 100 mole percent, preferably 50 to 100 percent. With the utilization of neutralized ionomers in this instant invention, it is preferred that the degree of neutralization be substantially complete, that is with no substantial free acid present and without substantial excess of the base other than that needed to ensure neutralization. The neutralized ionomers possess greater thermal stability compared to their acid form. Thus, it is clear that the polymers which are normally utilized in the instant invention comprise substantially neutralized pendant groups, and in fact, an excess of the neutralizing material may be utilized without defeating the objects of the instant invention.

The ionomeric polymers of the instant invention may vary in number average molecular weight from 1,000 to 10,000,000, preferably from 5,000 to 500,000, most preferably from 10,000 to 200,000. These polymers may be prepared by methods known in the art, for example, see U.S. Pat. No. 3,642,728, hereby incorporated by reference.

The preferred ionic copolymers for use in the instant invention, e.g., sulfonated ethylene propylene terpolymers sulfonated polystyrene and substituted derivatives thereof, may be prepared by the procedures described in U.S. Pat. No. 3,870,841, filed Oct. 2, 1972, in the names of H. S. Makowski, R. D. Lundberg and G. H. Singhal, hereby incorporated by reference.

The water insoluble base-containing copolymer will comprise from about 0.5 to 50 weight percent basic groups situated along the chain backbone, or alternatively the basic groups content will range from 4 milliequivalents to about 500 milliequivalents per 100 g of polymer. The basic groups may be conveniently selected from the groups containing polymerizable primary, secondary and tertiary amine groups. Included in these categories are pyridine, anilines, pyrroles, amides and other basic polymerizable ammonia derivatives. Specific polymers include styrene-4-vinylpyridine, t-butyl styrene-4-vinylpyridine, ethylene-4-vinylpyridine copolymers, propylene-4-vinylpyridine copolymers, acrylonitrile-4-vinylpyridine, methyl methacrylate-4-vinylpyridine copolymers, block copolymers and ethylene oxide/4-vinylpyridine, acrylic acid-4-vinylpyridine copolymers, ethylene-propylene-4-vinylpyridine terpolymers, isoprene-4-vinylpyridine, 4-vinylpyridine-elastomers copolymers and the like. The preferred base-containing polymers of the instant invention are styrene and 4-vinylpyridine and ethylene-propylene terpolymers with grafted 4-vinylpyridine. The former polymers are the preferred species.

These materials are parepared through conventional solution, suspension and emulsion copolymerization techniques.

The ionomeric polymers of the instant invention may be neutralized prior to incorporation into the organic solvent, or by neutralization of the acid form in situ. For example, preferably the acid derivative is neutralized immediately after preparation. For example, if the sulfonation of polystyrene is conducted in solution, then the neutralization of that acid derivative can be conducted immediately following the sulfonation procedure. The neutralized polymer may then be isolated by means well-known to those skilled in the art, i.e., coagulation, steam stripping, or solvent evaporation, because the neutralized polymer has sufficient thermal stability to be dried for employment at a later time in the process of the instant invention. It is well-known that the unneutralized sulfonic acid derivatives do not possess good thermal stability and the above operations avoid that problem.

It is also possible to neutralize the acid form of these polymers in situ; however, this is not a preferred operation, since in situ neutralization requires preparation of the sulfonic acid in the organic liquid which is to be subjected to the instant process, or the acid form of the ionic polymer must be dissolved in said organic liquid. The latter approach may involve handling of an acid form of an ionic polymer which has limited thermal stability. Therefore, it is quite apparent that the preparation and isolation of a neutralized ionic polymer affords the maximum latitude in formulation, less problems in handling polymers of limited thermal stability and maximum control over the final mixture of ionic polymer, polar cosolvent and organic liquid.

The copolymer of styrene/vinyl pyridine is typically formed by the emulsion copolymerization of freshly distilled styrene and N-vinylpyridine monomers. This method of copolymerization is generally known to those well-versed in the art. As noted previously, solution or suspension techniques may also be used to prepare those base-containing polymeric materials.

The interpolymer complex of the neutralized sulfonated polymer and the copolymer of styrene/vinyl pyridine is formed by forming a first solution of the neutralized sulfonated polymer in the previously described solvent system. A second solution of the copolymer of styrene/vinyl pyridine is formed by dissolving the copolymer of styrene/vinyl pyridine in an aromatic solvent such as xylene or benzene. Alternatively, both polymers can be dissolved simultaneously in the same solvent. The concentration of the neutralized sulfonated polymer in the solution is about 0.001 to about 5 g/dl, more preferably about 0.01 to about 4, and most preferably about 0.01 to about 1.5. The concentration of the copolymer of styrene/vinyl pyridine in the second solution is about 0.001 to about 5 g/dl, more preferably about 0.01 to about 4, and most preferably about 0.01 to about 1.5. The first solution of the neutralized sulfonated polymer and the second solution of the copolymer of styrene/vinyl pyridine are mixed together, thereby permitting the interaction of the neutralized sulfonated polymer and the copolymer of styrene/vinyl pyridine to form the water insoluble interpolymer complex. The molar ratio of neutralized sulfonated polymer to the copolymer of styrene/vinyl pyridine in the interpolymer complex is about 0.1 to about 20, more preferably about 0.5 to about 10, and most preferably about 1 to about 5. The concentration of the interpolymer complex in the hydrocarbon organic liquid is about 0.01 to about 10 weight percent, more preferably about 0.1 to about 7, and most preferably about 1.0 to about 5.

We have surprisingly found that a very important factor in determining the strength of the interaction between the amine-containing polymer and the sulfonate-containing polymer is the nature of the counterion. There are, broadly speaking, three major classes of such counterions. The first class, which are less preferred, are those metals of Group I and Group IIA, which include Li, Na, K, etc., Be, Mg, Ca, etc. We have found that these species do not interact as strongly with amine groups as the more preferred species described below. Those metals are commonly defined as members of the transition elements (see chemical text: "Chemical Principles and Properties", By M. J. Sienko and R. A. Plane, McGraw Hill Book Co., 1974, page 19). These metal cations are best exemplified by zinc and interact strongly with pyridine and similar amines. As a consequence, a zinc neutralized sulfonated polymer interacts much more strongly with a styrene/vinyl pyridine copolymer than does a magnesium or sodium neutralized system. It is for this reason that the transition elements are preferred with zinc, copper, iron, nickel and cobalt being especially preferred. We also include antimony and lead as suitable cations.

A third species which is preferred is the free acid of the sulfonated polymer, which will also interact with amine-containing polymers. In this latter case, it is clear that the interaction is a classic acid-base interaction, while with the transition metals, a true coordination complex is created, which is due to the donation of the electron pair of the nitrogen element. This distinction is a very important one and sets these complexes apart from classic acid-base interactions. The surprising observation is that such coordination complexes can form in such extreme dilution insofar as interacting groups are concerned, and that they are apparently formed so far removed from their expected stoichiometry, (based on small molecule analogs).

As discussed above, a variety of polymer backbones will display the desirable properties discovered in this invention and are summarized as follows:

| Sulfonate Polymer | Amine Polymer |
|---|---|
| • Sulfo-EPDM | • Styrene/Vinyl Pyridine Copolymer |
| • Sulfonate Isoprene Copolymers | |
| • Sulfonate SBR Polymers | • Vinyl Pyridine/Styrene/Butadiene Terpolymers |
| • Sulfonate Butadiene Polymers | |
| • Sulfonated Butyl | • Isoprene/Vinyl Pyridine Copolymer |
| • Sulfonated Acrylate and Methacrylate Copolymers | • Ethylacrylate/Vinyl Pyridine Copolymer and Alkyl Acrylate Copolymers with Vinyl Pyridine, where the Alkyl group varies in carbon number from 1 to 18 |
| • Sulfonated Block Polymers | |
| | • Methyl Methacrylate/Vinyl Pyridine Copolymer and Alkyl Methacrylate copolymers with Vinyl Pyridine, wherein the number of carbon groups in the alkyl group varies from 1 to 18 carbon atoms. |
| | • Butadiene/Vinyl Pyridine Copolymer |
| | • Propylene/Vinyl Pyridine Block Copolymer |
| | • Ethylene/Vinyl Pyridine Block Copolymer |
| | • t-Butyl Styrene/vinyl Pyridine Copolymers |
| | • Vinyl Pyridine Copolymers with alpha-beta ethylenically unsaturated copolymers or terpolymers. |

The amount of vinyl pyridine in the amine-containing polymer can vary widely, but should range from less than 50 weight percent down to at least 0.5 weight percent.

Preferably, the amine content in the basic polymer is expressed in terms of basic nitrogen. In this respect, the nitrogen content in amides and similar nonbasic nitrogen functionality is not part of the interacting species.

A minimum of three basic groups must be present on the average per polymer molecule and the basic nitrogen content generally will range from 4 meq. per 100 grams of polymer up to 500 meq. per 100 g. A range of 8 to 200 meq. per 100 g. is preferred.

The organic liquids, which may be utilized in the instant invention, are selected with relation to the ionic polymer and vice-versa. The organic liquid is selected from the group consisting of aromatic hydrocarbons, cyclic aliphatic ethers, aliphatic ethers, or organic aliphatic esters and mixtures thereof.

Specific examples of organic liquids to be employed with the various types of polymers are:

| Polymer | Organic Liquid |
|---|---|
| sulfonated polystyrene | benzene, toluene, ethyl benzene, methylethyl ketone, xylene, styrene, ethylenedichloride, methylene chloride. |
| sulfonated poly-t-butyl-styrene | benzene, toluene, xylene, ethyl benzene, styrene, t-butyl styrene, aliphatic oils, aromatic oils, hexane, heptane, decane, nonane. |
| sulfonated ethylene-propylene terpolymer | pentane, aliphatic and aromatic solvents, oils such as Solvent "100 Neutral," "150 Neutral" and similar oils, benzene, diesel oil, toluene, xylene, ethyl benzene, pentane, hexane, heptane, octane, isooctane, nonane decane aromatic solvents, ketone solvents. |
| sulfonated styrene-methyl-methacrylate copolymer | dioxane, halogenated aliphatics, e.g., methylene chloride, tetrahydrofuran. |
| sulfonated polyisobutylene | saturated aliphatic hydro- |

-continued

| Polymer | Organic Liquid |
|---|---|
| | carbons, diisobutylene, triisobutylene, aromatic and alkyl substituted aromatic hydrocarbons, chlorinated hydrocarbons, n-butyl ether, n-amyl. ether, methyl oleate, aliphatic oils, oils predominantly paraffinic in nature and mixtures containing naphthenic hydrocarbons. "Solvent 100 Neutral," "Solvent 150 Neutral" and all related oils, low molecular weight polymeric oils such as squalene, white oils and process oils having 60 percent or less aromatic content. |
| sulfonated polyvinyl toluene | toluene, benzene, xylene, cyclohexane, ethyl benzene, styrene, methylene chloride, ethylene dichloride. |

The viscosity of organic hydrocarbon solution of the interpolymer complex having an increased viscosity can be reduced by the addition of a polar cosolvent, for example, a polar cosolvent in the mixture of organic liquid and water insoluble interpolymer complex to solubilize the pendant ionomeric groups. The polar cosolvent will have a solubility parameter of at least 10.0, more preferably at least 11.0 and is water miscible and may comprise from 0.1 to 15.0 weight percent, preferably 0.1 to 5.0 weight percent of the total mixture of organic liquid, water insoluble ionomeric polymer, and polar cosolvent.

Normally, the polar cosolvent will be a liquid at room temperature; however, this is not a requirement. It is preferred, but not required, that the polar cosolvent be soluble or miscible with the organic liquid at the levels employed in this invention. The polar cosolvent is selected from the group consisting essentially of water soluble alcohols, amines, di- or tri-functional alcohols, amides, acetamides, phosphates, or lactones and mixtures thereof. Especially preferred polar cosolvents are aliphatic alcohols such as methanol, ethanol, n-propanol, isopropanol, 1,2-propane diol, monoethyl ether of ethylene glycol, and n-ethylformamide.

DETAILED DESCRIPTION OF THE PREFERRED EMBODIMENT

The following examples will demonstrate the performance of an interpolymer complex consisting of a sulfonated polystyrene and a styrene-4-vinylpyridine in several specific nonpolar hydrocarbon solvent environments.

EXAMPLE 1

A representative example for the synthesis of styrene-4-vinyl-pyridine copolymer (STY-4VP) is outlined below.

Into a 1-liter, 4-neck flask add:
50 g distilled styrene
3.2 g sodium lauryl sulfate
120 ml. distilled water
0.1 g dodecylthiol
0.2 g potassium persulfate
4.7 g 4-vinylpyridine The solution was purged with nitrogen gas for 10 minutes to remove dissolved oxygen. As the nitrogen gas purge began, the solution was heated to 55° C. After 24 hours, the polymer was precipitated from solution with methanol. Subsequently, the resulting polymer was washed several times with a large excess of methanol and dried in a vacuum oven at 60° C. for 24 hours. Elemental analysis shows a nitrogen content of 1.68 weight percent, which corresponds to 12.5 mole percent 4-vinyl pyridine.

The synthesis of zinc neutralized sulfonated ethylene-propylene ionomers (S-EPDM) has been described previously, for example, H. S. Makowski et al., "Ions in Polymers," Advances in Chemistry, Series 187, ACS Publication (1980), p. 3.

EXAMPLE 2

It was observed that when a clear, thin solution of 2% concentration of styrene-co-4-vinyl pyridine in xylene was added dropwise to 10 ml. of a stirred, solution of 1% concentration of 10 meq. sulfonated, zinc neutralized EPDM in xylene, thickening began after the addition of about seven drops. Adding up to ten drops of the styrene-co-4-vinyl pyridine solution resulted in the formation of a thick, clear gel. With continued addition of the styrene-co-4-vinyl pyridine solution, the solution mixture gradually became thinner.

To obtain viscosity measurement of this observed phenomenon, we prepared similar solutions of sufficient volume so as to obtain viscosity measurements as the styrene-co-4-vinyl pyridine solution was added to the 10 meq. Sulfo-Zn-EPDM solution. Viscosity of each solution was initially obtained. Then as each increment of styrene-co-4-vinyl pyridine solution was added to the Sulfo-EPDM solution, Brookfield viscosity was obtained at 25° C.

The resulting viscosities, as a function of the percent levels of each polymer in the blend, are given in the following table.

| S-EPDM (Weight Percent) | STY-4VP (Weight Percent) | Viscosity (cP) |
|---|---|---|
| 100 | 0 | 4.6 |
| 98.4 | 1.6 | 6.9 |
| 97.4 | 2.6 | 10.5 |
| 94.9 | 5.1 | 96. |
| 92.6 | 7.4 | 123. |
| 90.4 | 9.6 | 95. |
| 88.2 | 11.8 | 29.9 |
| 86.2 | 13.8 | 24. |
| 84.3 | 15.7 | 17.7 |
| 0 | 100 | 1.75 |

It is readily observed that the soluble interpolymer complex is dramatically more effective at low polymer levels as a viscosifier for low-polarity organic medium than either of the two individual components. Furthermore, the viscosity values are significantly larger than the mean values of each copolymer.

Also, low viscosity values occur if a charge is not present on one of the polymers. For example, if unsulfonated EPDM is added (as previously described) to STY-co-4VP solutions, the viscosity spans the range of 1.75 to 1.96 cps over the identical concentration range. Clearly, the complex is a more effective viscosifier than a mixture of a charged and uncharged material.

The mechanism for this viscosity enhancement is due primarily to the increase in the apparent molecular weight of the polymer through formation of intermolecular associations.

EXAMPLE 3

A zinc-sulfo-EPDM polymer at 10 meq. sulfonation level on a 90,000 weight average molecular weight backbone was dissolved in xylene at 1.1 weight percent. A copolymer of poly-styrene-co-vinyl pyridine at a 12.5 mole percent vinyl pyridine and an approximate molecular weight of 100,000 was dissolved in xylene at 2 weight percent concentration. These two solutions will be referred to as Solution A and Solution B, respectively.

Solution A is a shear thinning fluid having a 25° C. viscosity of 4.2 cP at low shear rate (30 1/sec or less) and a viscosity of 3.9 cP at a higher shear rate of 300 1/sec. Solution B has a 25° C. viscosity of 1.4 cP up to a shear rate of 300 1/sec.

Solution A and Solution B were mixed at 96 parts of A to 4 parts of B to yield an interpolymer complex, Solution C, at 1.136 weight percent polymer in xylene and a molar ratio of $N^+/SO_3^-$ of about 1:1. The viscosity of Solution C at 25° C. was:

| Shear Rate (1/sec) | Viscosity (cP) |
| --- | --- |
| 3 | 43.2 |
| 15 | 52.8 |
| 30 | 62.5 |
| 60 | 74.7 |
| 100 | 80.5 |
| 150 | 72.5 |
| 300 | 48.2 |

Shear thickening behavior is observed up to a shear rate of about 100 1/sec. This behavior is in marked contrast to the individual polymer components. In addition, the viscosity of Solution C is also significantly higher than those of Solution A and Solution B.

EXAMPLE 4

Solution A of Example 3 was used as the anionic polymer solution. A copolymer of poly-styrene-co-vinyl pyridine at 8 mole percent vinyl pyridine and approximate molecular weight of 2 million was dissolved in xylene at 2 weight percent concentration (Solution D). The viscosity of Solution D at 25° C. was about 48 cP at a shear rate of 1 1/sec and 27 cP at a shear rate of 300 1/sec.

Solution A, Solution D, and xylene were mixed at a ratio of 100/25/408.33 to yield an interpolymer complex, Solution E, at 0.3 weight percent polymer in xylene and a molar ratio of $N^+/SO_3^-$ of about 3.6:1. The viscosity of Solution E at 25° C. was:

| Shear Rate (1/sec) | Viscosity (cP) |
| --- | --- |
| 3 | 4.2 |
| 30 | 3.8 |
| 60 | 11–20 |
| 300 | 10–13 |

Solution E showed strong shear thickening between the shear rates of 30 and 60 1/sec. Solution E also behaved as a "progressively" shear thickening fluid at higher shear rates. At 300 1/sec viscosity rose from 10 cP, at 30 sec under shear to 11.2 cP, at 2 minutes under shear to 13 cP, at 8 minutes under shear and continued to grow. Furthermore, for the low concentration of 0.3 weight percent Solution E exhibited a very high viscosity.

Solution C of Example 3 and Solution E of Example 4 are expected to be antimisting using the criterions of Peng and Landel. Both of these solutions exhibited a sharp drop in viscosity and a loss of their shear thickening behavior upon addition of a small amount of methanol (0.1–5% or less).

What is claimed is:

1. A process for forming a shear thickening organic liquid having a viscosity of at least about 10 cps which includes the steps:
   (a) forming a first solution of an organic liquid and a substantially neutralized sulfonated polymer having a sulfonate content of from about 4 to about 200 milliequivalents per 100 grams of said polymer, said sulfonated polymer having a molecular weight of about 1,000 to about 10,000 and having a polymeric backbone selected from the group consisting of polystyrene, poly-t-butylstyrene, ethylene propylene terpolymer, styrenemethylmethacrylate copolymer, polyisobutylene Butyl rubber or polyvinyltoluene, said organic liquid of said first solution being selected form the group consisting of aliphatic hydrocarbons, aromatic hydrocarbons, cyclic aliphatic ethers, aliphatic ethers, chlorinated hydrocarbons, organic ketones or organic aliphatic esters and mixtures thereof, the concentration of said neutralized sulfonated polymer in said first solution being about 0.001 to about 5 g/dl;
   (b) forming a second solution of an organic liquid and an amine containing polymer which contains basic nitrogen atoms, wherein the basic nitrogen content ranges from about 4 to about 500 milliequivalents per 100 grams of polymer, the concentration of said amine containing polymer in said second solution being about 0.001 to about 5.0 g/dl, said organic liquid of said second solution being selected form the group consisting of aliphatic hydrocarbons, aromatic hydrocarbons, cyclic aliphatic ethers, aliphatic ethers, chlorinated hydrocarbons, organic ketones or organic aliphatic esters and mixtures thereof; and
   (c) mixing said first and second solutions to form an organic liquid having an interpolymer complex of said neutralized sulfonated polymer and said amine containing polymer dissolved therein, a molar ratio of said neutralized sulfonated polymer to said amine containing polymer being about 0.1 t about 20.0, wherein said complex is present at a level of form 0.01% to about 10% and the viscosity of said solution increases by at least 10% as shear rate increases.

2. A process according to claim 1, wherein said amine containing polymer polymer is a neutralized sulfonated polymer having about 4 to about 200 meq. of pendant $SO_3H$ groups per 100 grams of polymer.

3. A process according to claim 2 wherein said $SO_3H$ groups are neutralized with an ammonium or metal counterion.

4. A process according to claim 3 wherein said metal counterion is selected from the group of transition elements.

5. A process according to claim 3 wherein said $SO_3H$ groups are at least 90 mole percent neutralized.

6. A process according to claim 1 wherein said organic liquid is selected from the group consisting of benzene, toluene, ethyl benzene, xylene, or styrene and mixtures thereof.

7. A process according to claim 1 or 2 wherein said amine containing polymer polymer is a copolymer of styrene/vinyl pyridine.

8. A process according to claim 1, wherein said styrene-4 vinylpyridine copolymer has about 0.1 to 25 mole percent 4 vinylpyridine units.

9. A process according to claim 1, wherein said base-containing polymer is selected from the group containing primary, secondary and tertiary amine units.

10. A process according to claim 1, wherein said interpolymer complex thickening characteristics are modulated or totally eliminated by a polar cosolvent.

11. A process according to claim 10 wherein said polar cosolvent has a greater polarity than said organic liquid.

12. A process according to claim 10 wherein said polar cosolvent is selected from the group consisting of aliphatic alcohols, aliphatic amines, di- or tri- functional aliphatic alcohols, water miscible amides, acetamides, phosphates, or lactones and mixtures thereof.

13. A process according to claim 10 wherein said polar cosolvent is selected from the group consisting of methanol, ethanol, propanol, isopropanol and mixtures thereof.

14. A process according to claim 10 wherein said polar cosolvent has a solubility parameter of at least about 10 and is water miscible.

15. A process according to claim 4 wherein said transition elements are selected from the group consisting of zinc, copper, iron, nickel and cobalt.

* * * * *